United States Patent
Fiedler et al.

(10) Patent No.: US 7,448,286 B2
(45) Date of Patent: Nov. 11, 2008

(54) SYSTEM FOR DETERMINING WORKING PARAMETERS OF A MAGNETIC CLUTCH

(75) Inventors: Jürgen Fiedler, Bad Mündel (DE); Bernd Hellmich, Hannover (DE); Normann Plass, Hannover (DE); Falk Bahm, Kerken (DE)

(73) Assignees: Richter Chemie-Technik GmbH, Kempen (DE); Kerntech GmbH, Barsinghausen (DE)

( * ) Notice: Subject to any disclaimer, the term of this patent is extended or adjusted under 35 U.S.C. 154(b) by 222 days.

(21) Appl. No.: 11/397,954

(22) Filed: Apr. 4, 2006

(65) Prior Publication Data

US 2006/0243069 A1    Nov. 2, 2006

(30) Foreign Application Priority Data

Apr. 6, 2005   (DE) ................. 10 2005 015 742

(51) Int. Cl.
   *G01L 3/02*   (2006.01)
(52) U.S. Cl. .................. 73/862.331; 73/862.326
(58) Field of Classification Search ............ 73/862.321, 73/862.325–862.332; 324/260
   See application file for complete search history.

(56) References Cited

U.S. PATENT DOCUMENTS

| | | | |
|---|---|---|---|
| 4,878,206 A | * | 10/1989 | Grosso et al. ............... 367/83 |
| 5,195,382 A | | 3/1993 | Peilloud |
| 6,380,658 B1 | * | 4/2002 | Sebastian et al. ............ 310/261 |
| 6,467,944 B2 | | 10/2002 | Ugolini |
| 2004/0027116 A1 | * | 2/2004 | Gester .................. 324/207.16 |

FOREIGN PATENT DOCUMENTS

DE    3605889    8/1987

* cited by examiner

*Primary Examiner*—Edward Lefkowitz
*Assistant Examiner*—Punam Patel
(74) *Attorney, Agent, or Firm*—Andrew Wilford

(57) ABSTRACT

A magnetic clutch has a rotatable input part with first magnets and a rotatable output part with second magnets, the output part being magnetically coupled to the input part. At least one sensor measures a magnetic field or its temporal differentiation and is positioned to measure the magnetic field or its temporal differentiation resulting from the interference of the magnetic field of the first magnets of the input part with the magnetic field of the second magnets of the output part. The output of the sensor is processed by an evaluation unit operative to determine at least one working parameter.

18 Claims, 5 Drawing Sheets

SYSTEM FOR DETERMINING WORKING PARAMETERS OF A MAGNETIC CLUTCH

FIELD OF THE INVENTION

The present invention relates to a magnetic clutch. More particularly this invention concerns a system for determining the working parameters of a magnetic clutch.

BACKGROUND OF THE INVENTION

A magnetic clutch has a rotatable drive or input part with first magnets and a coaxially rotatable power output part with second magnets. The output part is magnetically coupled to the input part and the device has at least one sensor for measuring a magnetic field or its temporal differentiation, that is change in field strength with respect to time.

Devices and methods of the is type are known, for example from U.S. Pat. No. 6,467,944. With magnetic clutches, an angular offset appears between the input part with first magnets and the output part with second magnets that depends on the torque applied through the magnetic clutch. This angular offset is roughly proportional to the torque transmitted through the magnetic clutch. In US '944 two sensors are arranged to ascertain the magnetic fields of the two parts of the clutch. The first sensor detects the magnetic field of the input part and the second sensor that of the output part. According to the signals of the two sensors a time lag is ascertained, from which, in turn, the angular offset and thus the torque are determinable.

In such a system, therefore, two sensors have to be arranged to ascertain working parameters, from whose signal responses a time lag is derived to measure the transmitted torque. The provision of two sensors adds to manufacturing costs. Furthermore, it is expensive to calibrate such a two-sensor system, since two sensors and, thus, two measurement chains have to be calibrated.

OBJECTS OF THE INVENTION

It is therefore an object of the present invention to provide an improved system for determining working parameters of a magnetic clutch.

Another object is the provision of such an improved system for determining working parameters of a magnetic clutch that overcomes the above-given disadvantages, in particular that is relatively inexpensive to manufacture and easy to calibrate.

SUMMARY OF THE INVENTION

This need is met by the inventive device for determining working parameters of a magnetic clutch that has a rotatable input part with first magnets and a rotatable output part with second magnets, the output part being magnetically coupled to the input part. The device has at least one sensor for the measurement of a magnetic field or its temporal differentiation and positioned to measure the magnetic field or its temporal differentiation resulting from the interference of the magnetic field of the first magnets of the input part with the magnetic field of the second magnets of the output part. The output of the sensor is processed by an evaluation unit operative to determine at least one working parameter.

The inventive method for determining working parameters of a magnetic clutch of the aforementioned nature thus comprises the steps of:

Measuring the temporal shape of the resulting magnetic field from the interference of the magnetic field of the first magnets of the output part with the magnetic field of the second magnets of the input part or its temporal differentiation by means of a sensor; and Determining at least one working parameter from the measured resulting magnetic field or its temporal differentiation by means of an evaluation unit.

Since now only one sensor is arranged in a position in which the magnetic field or its temporal differentiation resulting from the interference of the magnetic field of the first magnets of the input part with the magnetic field of the second magnets of the output part is ascertainable through a sensor, the instrumental expenses and the expenses for the calibration of the sensor and the measurement chain is noticeably reduced as compared to the state of the art, leading to a reliable and economical solution.

Preferably, the assigned torque is ascertained by means of the evaluation unit from the resulting magnetic field or its temporal differentiation.

In dependence on the torque assigned to the magnetic clutch, an angular offset appears between the input part with first magnets and the output part with second magnets. This angular offset leads to an alteration of the resulting magnetic field or its temporal differentiation that results from an interference of the magnetic fields of the first magnets of the input part with the second magnets of the output part. The shape of the resulting magnetic field or its temporal differentiation, i.e. the temporal shape, thus depends on the angular offset between input part and output part. Based on the resulting magnetic field or its temporal differentiation working parameters of the magnetic clutch, particularly the assigned torque can be determined.

The invention thereby benefits from the fact that the resulting magnetic field or its temporal differentiation changes its characteristics or shape as a result of an angular offset between the input and output parts and that by means of an analysis of the characteristics and shape of the resulting magnetic field or its temporal differentiation, working parameters of the magnetic clutch are ascertainable. Therefore, it is sufficient to detect the resulting magnetic field with an appropriate sensor.

In an unstressed state when the clutch is transmitting very little or no torque, the inner and outer ring's pair of magnets align exactly opposite to each other, so that the entire clutch is symmetrical (for direction change). The measured time signal of the resulting magnetic field or its temporal differentiation is thus symmetrical with respect to time, i.e. in the graph it is presented mirror-symmetrical against the y-axis.

If the clutch is stressed and is transmitting considerable torque, the relative shifting of the inner and outer rings lead to a breach of symmetry that, in turn, leads to a deformation of the rising edge (not symmetrical anymore) against the trailing edge.

In a preferred embodiment, the evaluation unit subjects the temporal shape of the resulting magnetic field or its temporal differentiation, particularly the temporal shape of time segments of fixable length of the resulting magnetic field or its temporal differentiation to a Fourier transformation, i.e. to a harmonic analysis. The Fourier transformation can be conducted favorably through use of the FFT algorithm (fast Fourier transformation). With the Fourier transformation, the north and south magnetic pole pairs' passing frequency is preferably defined as the first-order harmonic.

Preferably, the amplitude and/or relative phase position of at least one harmonic of the resulting magnetic field relative to another harmonic is ascertainable by the evaluation unit from the temporal shape of the resulting magnetic field or its temporal differentiation, particularly of time segments of fixable length of the resulting magnetic field or its temporal differentiation.

It has been shown that the phase position of certain harmonics of the shape of the resulting magnetic field depends on the torque being transferred by the magnetic clutch. Thus, the assigned torque can be ascertained directly from the interrelationship between the phase positions associated with respective harmonics.

When the clutch is working under load, the shape of the temporal shape of the magnetic field or its temporal differentiation changes due to the twisting of the magnetic rings against each other. In fact, the FFT is not the only possibility to analyze the shape, since e.g. static parameters also show a dependence on the torque.

However, since the time signal is periodic, the FFT is the most sensible approach. Every periodic signal can be fully described by means of its Fourier components, so that the FFT offers a comprehensive analysis. Moreover, the FFT has further advantages: the signal's non-periodic noise can be suppressed to a large extent through an averaging of the FFT for several periods. Eventually, parameters which have been accumulated by means of the FFT are the most robust under various outer circumstances.

Preferably, a comparison of the amplitude and/or relative phase position of at least two harmonics of the resulting magnetic field or its temporal differentiation, particularly of two harmonics of unequal order with stored values, are done by the evaluation unit. By means of this comparison to stored values, reliable monitoring is warranted, since e.g. an automatic decoupling can be effected when the acceptable maximum values are exceeded.

The sensor can either be a Hall effect sensor or a coil. By means of coils of this nature it is possible to measure a magnetic field or its temporal differentiation.

In another preferred embodiment, a memory is provided that stores the temporal shape of the resulting magnetic field or its temporal differentiation, particularly of time segments of fixable length of the resulting magnetic field or its temporal differentiation at least temporarily. Such a memory can be particularly a permanent storage for long-term monitoring, e.g. a hard disk.

Preferably, the number of the first magnets of the input part of the magnetic clutch is equal to the number of the second magnets of the output part.

In still another preferred embodiment, the input part of the magnetic clutch is coupled to a motor, particularly to an electric motor.

In another preferred embodiment, an A/D-convertor part is provided for digitizing an analog sensor signal, particularly with a fixable sample rate. Preferably, a filter part is provided for an analogue and/or a digitized sensor signal, particularly a low-pass filter with a fixable cut-off frequency.

By means of an appropriate provision of the parameters of the filter as well as of the sample rate of the converter, an appropriate determination of the sensor signal is feasible. Thus the sample rate can be chosen so that a corresponding number of higher harmonics of the base frequency of the resulting magnetic field or its temporal differentiation is contained in the sensor signal, wherein by means of the corresponding provision of the parameters of the filter, the sampling theorem can be maintained, whereby the sample rate has to be at least twice as high as the highest frequency contained in the signal.

Preferably, the sensor is arranged between the input part with first magnets and the output part of the second magnets or is arranged in or on a body which surrounds the input part.

Through the positioning of the sensor, it is guaranteed that the sensor can measure the magnetic field or its temporal differentiation resulting from the interference of the magnetic field of the first magnets of the input part with the magnetic field of the second magnets of the output part.

The implementation of a Fourier transformation is preferably carried out on the temporal shape of time segments of fixable length of the resulting magnetic field or its temporal differentiation, the time segments being preferably determined in such a way that they correspond to the time for a single rotation of the input part or an whole-number multiple of the time of a single revolution of the input part.

In an alternative embodiment of the invention, a filter bank can be provided, particularly a filter bank of several band-pass filters, the cut-off band-pass filter frequencies being determined in a way that the transmission bands of the filter bank are aligned to several fixable harmonics, so that these areas are not filtered out.

By means of such a filter bank it is, therefore, possible to obtain the first-order harmonic by means of a first filter part of the filter bank with a transmission band aligned to the first-order harmonic, as well as to obtain a harmonic of higher order, particularly a harmonic of unequal order by means of a second filter part of the filter bank with a correspondingly aligned transmission band and to ascertain the phase offset between the two chosen harmonics. The filter bank thus extracts the harmonics, from which in turn the phase offset and working parameters of the magnetic clutch, particularly of the torque assigned on the magnetic clutch, are ascertainable.

Thus, it is possible to sub-divide the sensor's input signal for determining the resulting magnetic field or its temporal differentiation into several fixable frequency bands for further analysis.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
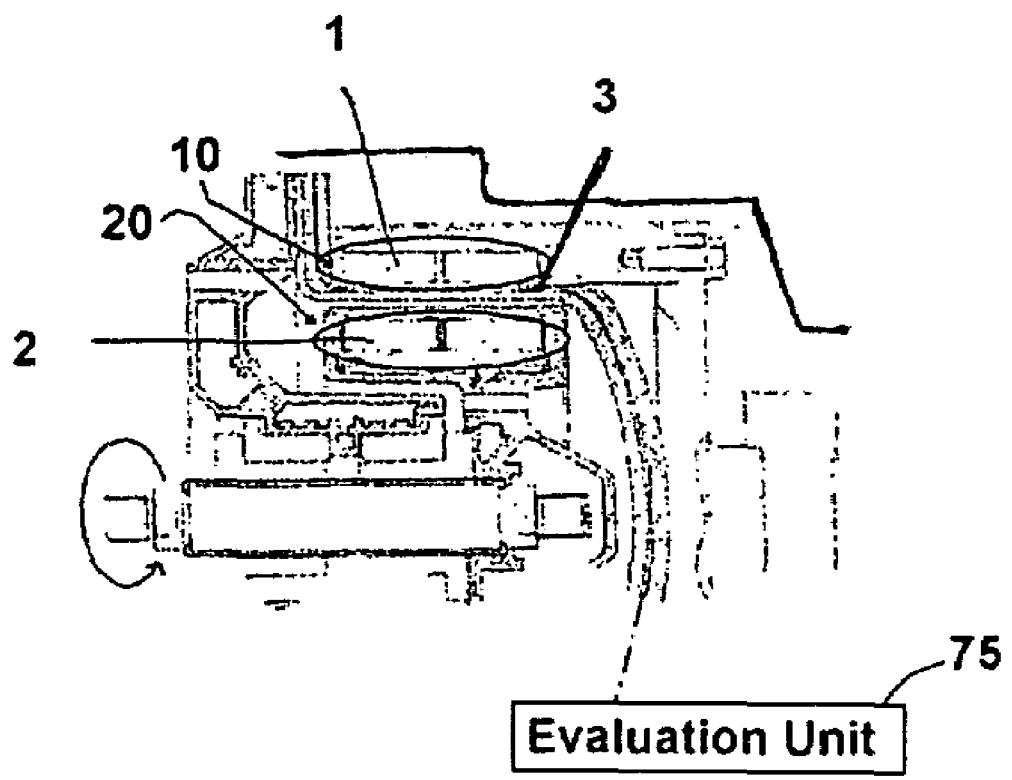
FIG. 1 is a partly diagrammatic sectional view of the inventive device through a pump with a magnetic clutch.

As seen in FIG. 1 a magnetic clutch has with a rotatable input part 10 with first magnets 1. The input part 10 is coupled to an electric motor shown schematically at N and is driven by this motor M. Furthermore, the clutch has an output part 20 with second magnets 2 magnetically coupled to the input part 10. A sensor 3 is positioned such that the magnetic field or its temporal differentiation resulting from the interference of the magnetic field of the first magnets 1 of the input part 10 with the magnetic field of second magnets 2 of the output part 20 is detectable by means of this sensor 3. The sensor 3 can output a signal to an evaluation unit 75.

Figure 2:
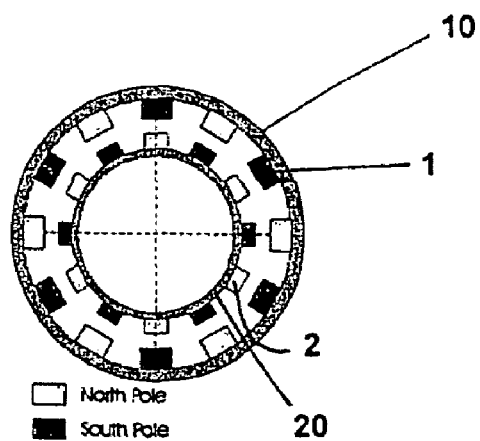
FIG. 2 is a sectional view of the inventive device through the magnetic clutch in an unstressed state, that is when not transmitting substantial torque.
Figure 3:
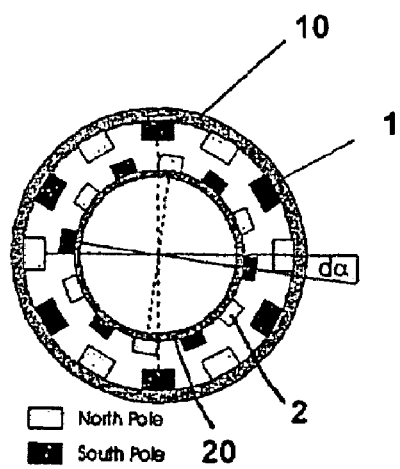
FIG. 3 is a sectional view of the inventive device through the magnetic clutch in a stressed state, that is when transmitting torque.

FIG. 2 shows a section through the magnetic clutch with the input part 10 constituted as an outer ring carrying the first magnets 1 as well as an inner ring of constituting the output part 20 with the second magnets 2. In FIG. 2, the magnetic clutch is unstressed, that is it is transferring a torque M equal to 0. In this state, the north and south magnetic poles of the magnets 1 of the outer ring 10 of the input part and magnets 2 of the inner ring 20 of the output part align opposite each other. In a stressed state of the magnetic clutch according to FIG. 3, i.e. when a torque is applied through the magnetic clutch, an angle dα is formed. This the angle dα is directly proportional to the torque transmitted through the magnetic clutch. In this case, the north and south magnetic poles of magnets 1 and 2, respectively, do not align exactly opposite each other, but are angularly offset relative to one another exactly at the mentioned angle dα.

Figure 4:
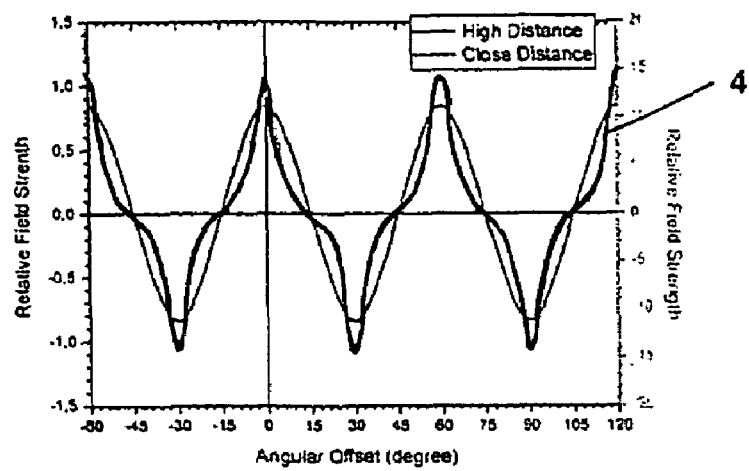
FIG. 4 shows the shape of the resulting magnetic field in the unstressed state of FIG. 2.
Figure 5:
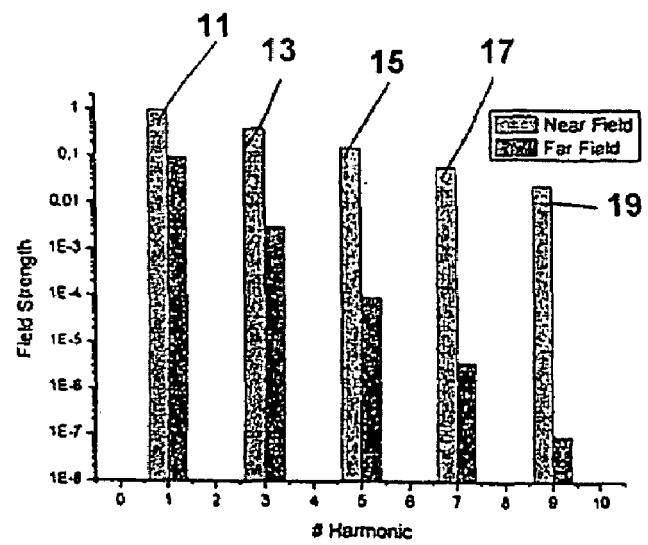
FIG. 5 shows the amplitudes of the harmonic of the resulting magnetic field according to FIG. 4.

In FIG. 4, the shape of the resulting magnetic field from the interference of the magnetic field of the input part with first magnets 1 and the output part with second magnets 2 in an unstressed state is illustrated. In the unstressed state, the resulting magnetic field, whose shape 4 is illustrated in FIG. 4, is periodic. By means of a harmonic analysis of the periodic shape of the signal 4 according to FIG. 4, the amplitudes 11, 13, 15, 17, 19 of the harmonic of the signal 4 illustrated in FIG. 5 in an unstressed state can be determined.

Figure 6:
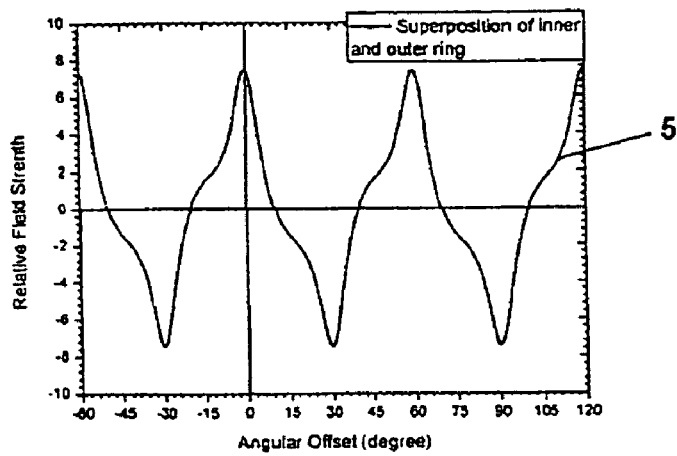
FIG. 6 shows the shape of the resulting magnetic field in a stressed state according to FIG. 3.

In a stressed state, i.e. when a torque applied to the magnetic clutch is greater than 0, the resulting magnetic field experiences an alteration of the shape. The shape 5 of the resulting magnetic field, as a consequence of the angle dα between the input-part outer ring 10 part and the output-part inner ring 20 is altered as illustrated in FIG. 6. From the altered shape 5 of the resulting magnetic field, working parameters of the magnetic clutch, particularly the applied torque, can be ascertained.

Figure 7:
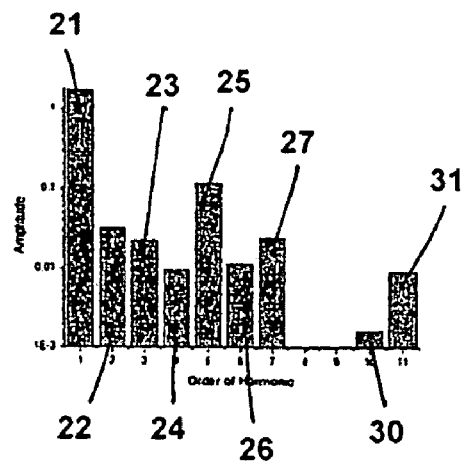
FIG. 7 shows the amplitudes of the harmonic of the resulting magnetic field in a stressed state according to FIG. 6.

By means of a harmonic analysis of the altered resulting magnetic field of signal shape 5, the amplitudes of harmonics 21, 22, 23, 24, 25, 26, 27, 30, 31 contained in signal 5 can be ascertained according to FIG. 7. The respective spectrograms according to FIG. 5 for the unstressed state of the magnetic clutch and the stressed state of the magnetic clutch according to FIG. 7 illustrate the alterations of the amplitudes of several harmonics of signal 4 in unstressed state and signal 5 in a stressed state respectively.

Figure 8:
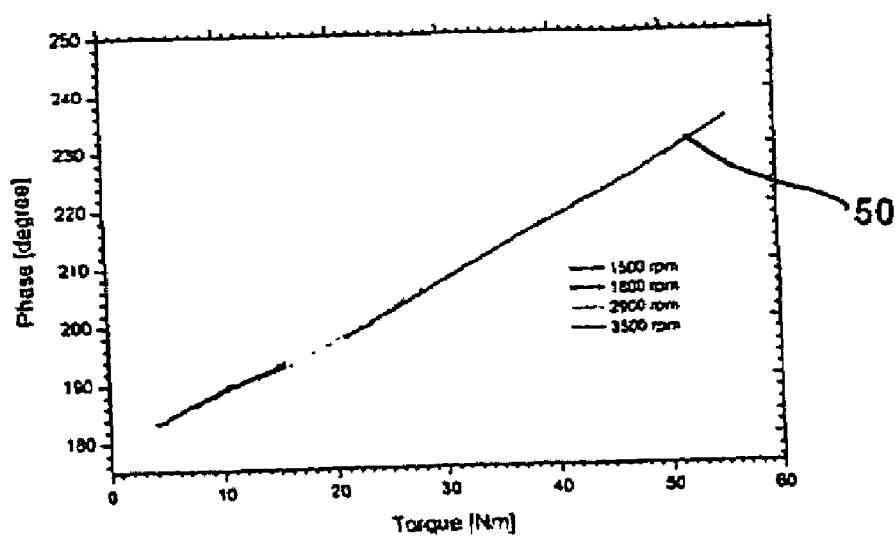
FIG. 8 shows the phase position of the fifth harmonic of the resulting magnetic field in dependence of the assigned torque.

Thus the phase position of certain harmonics, particularly of harmonics of unequal order, is precisely illustratable on the torque assigned to the magnetic clutch. FIG. 8 illustrates the relative phase position 50 of the fifth harmonic 15, 25 shown in FIGS. 5 and 7, respectively, in dependence on the torque assigned to the magnetic clutch. An approximate linear interrelationship between the phase position 50 of the fifth harmonic 15, 25 shown in FIG. 8 and the torque assigned on the magnetic clutch is thus demonstrated. By means of a shape analysis of the magnetic field or its temporal differentiation measured by means of a sensor, determining working parameters of the magnetic clutch, particularly determining the torque, is performed by evaluation unit 75.

Figure 9:
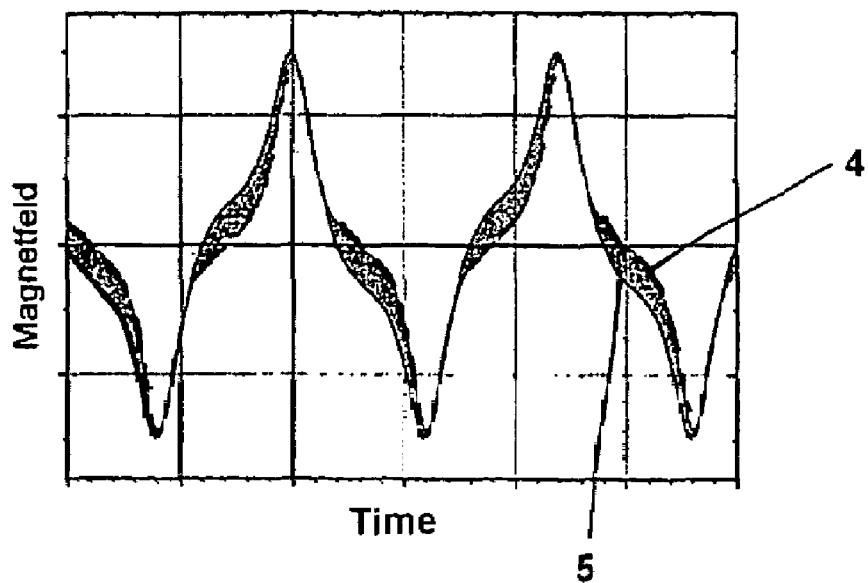
FIG. 9 shows the shape of the resulting magnetic field in an unstressed, as well as in a stressed state.

The illustration according to FIG. 9 is an exaggerated simulation; the actual signal's deformation is substantially less pronounced and is not visible to the naked eye. In an unstressed state, the inner and outer ring's magnet pairs align exactly opposite to each other, so that the entire clutch is symmetrical. The measured time signal 4 of the resulting magnetic field in an unstressed state is thus symmetrical with respect to time, i.e. in the graph it is mirror-symmetrical on the y-axis.

If the clutch is stressed, the twisting of inner and outer rings 10 and 20 leads to a breach of symmetry that leads to a deformation of the rising edge (not symmetrical anymore) in the graph of the magnetic signal 5 against the trailing edge. This breach of symmetry leads however to the phases of the harmonic components not being zero anymore in the Fourier analysis, as they were in the unstressed symmetric case. A stressing of the magnetic clutch, i.e. when a torque is applied, results in the magnets 1 of the input part 10 as well as the magnets 2 of the output part 20 not aligning exactly opposite each other anymore. This results in a breach of symmetry of the resulting magnetic field which results in a displacement of the harmonic phase from zero in dependence on how much the clutch is stressed, i.e. on how great the applied torque is.

Thus by means of the relative phase position, derived from the harmonic analysis, one can determine the torque.

We claim:

1. A device for determining working parameters of a magnetic clutch, the device comprising:
    an input part provide with an array of first magnets generating a first magnetic field;
    an output part provided with an array of second magnets generating a second magnetic field, the input and output parts being magnetically coupled and rotatable relative to one another, the two fields overlapping at least partially and thus forming a combined magnetic field;
    means including at least one sensor for measuring the combined magnetic field and for generating a signal corresponding thereto; and
    means including an evaluation unit coupled to the sensor for receiving the signal and determining therefrom at least one working parameter of the clutch, the evaluation unit being operative
        to process a temporal course of time segments of fixable length of the resulting magnetic field or its temporal differentiation based on a Fourier transformation and
        to determine an amplitude of at least one harmonic of the temporal course or a relative phase position of the at least one harmonic of the temporal course or the amplitude and relative phase position of the temporal course.

2. The device defined in claim 1 wherein the working parameter includes a torque applied through the magnetic clutch.

3. The device defined in claim 1 wherein the evaluation unit is operative to compare the amplitude of or the relative phase position of or the amplitude and relative position of the one harmonic of the temporal course of resulting magnetic field or its temporal differentiation with stored predetermined values, the one harmonic being of an odd order.

4. The device defined in claim 1, further comprising
    a storage unit operative to at least temporarily store the temporal course of the resulting magnetic field or its temporal differentiation including the time segments of fixable length.

5. The device defined in claim 1 wherein the sensor is a Hall effect sensor or a coil.

6. The device defined in claim 1 wherein a number of the first magnets of the input part corresponds to a number of the second magnets of the output part.

7. The device defined in claim 1, further comprising
an electric motor coupled to and actuating the input part.

8. The device defined in claim 1, further comprising
an analog/digital converter operative to digitize the signal outputted by the sensor at a fixable sample rate.

9. The device defined in claim 8, further comprising
a low-pass filter with fixable cutoff frequency coupled to the AD converter and operative to filter the digitized sensor signal.

10. The device defined in claim 1, wherein the sensor is located between the input and output parts or mounted in a body surrounding the input part.

11. A method for determining a working parameter of a magnetic clutch having an input part and an output part magnetically coupled to and rotatable relative to each other, the parts each being configured with respective arrays of first and second magnets, the method comprising the steps of:
   interfering a magnetic field generated by the first magnets with a magnetic field generated by the second magnets, thereby generating a combined magnetic field;
   measuring a temporal course of the resulting magnetic field or its temporal differentiation by a sensor; and
   determining the one working parameter based on the measured resulting magnetic field or its temporal differentiation by an evaluation unit utilizing a Fourier transformation to evaluate time segments of fixable length of the temporal course of the resulting magnetic field or its temporal differentiation.

12. The method defined in claim 11 wherein determining the one working parameter is a torque transmitted through the clutch.

13. The method defined in claim 11, further comprising the step of:
   fixing the time segments so as to correspond to a time of a single revolution of the input part or an whole-number multiple thereof before evaluting the time segments.

14. The method defined in claim 11, wherein the step of determining the one working parameter includes determining an amplitude of or a relative phase position of or the amplitude and relative phase position of two harmonics of the resulting magnetic field or its temporal differentiation, the two harmonics being of unequal order.

15. The method defined in claim 14, further comprising the steps of:
   storing a reference amplitude value or a reference phase position or the reference the amplitude and relative phase position values; and
   comparing the amplitude or the relative phase position or the amplitude and relative phase position of at least one harmonic to the respective stored reference values, thereby determining the one working parameter.

16. The method defined in claim 14, further comprising the step of
   at least temporarily storing the time segments of fixable length in a storage unit.

17. The method defined in claim 11, further comprising the step of
   digitizing a signal output of the sensor at a fixed sample rate with an analog-digital converter.

18. The method defined in claim 17, further comprising the step of:
   filtering the digitized signal with a low-pass filter with a fixable cut-off filter frequency.

* * * * *